United States Patent [19]
Nosaki et al.

[11] Patent Number: 5,473,776
[45] Date of Patent: Dec. 5, 1995

[54] DATA BACKUP METHOD AND DATA PROCESSING SYSTEM HAVING DATA MAINTENANCE FUNCTION

[75] Inventors: Hiroshi Nosaki, Kawasaki; Naoki Miwa, Hitachi; Tomoaki Nakamura, Katsuta, all of Japan

[73] Assignee: Hitachi, Ltd., Tokyo, Japan

[21] Appl. No.: 18,456

[22] Filed: Feb. 16, 1993

[30] Foreign Application Priority Data

Feb. 20, 1992 [JP] Japan ..................... 4-033120

[51] Int. Cl.$^6$ ............... G06F 12/00; G06F 11/00
[52] U.S. Cl. ............ 395/700; 395/650; 364/DIG. 1; 364/246.3; 364/252.3; 364/252.5; 364/252.7
[58] Field of Search ............... 395/650, 700; 364/DIG. 1, DIG. 2, 943.91, 944.1, 943.92, 246.3, 252.3, 252.5, 252.7

[56] References Cited

U.S. PATENT DOCUMENTS

| | | | |
|---|---|---|---|
| 5,212,784 | 5/1993 | Sparks | 395/575 |
| 5,276,860 | 1/1994 | Fortier et al. | 395/575 |

OTHER PUBLICATIONS

Employees of Borland; *Turbo C$^{++}$ Library Reference*.

Primary Examiner—Kevin A. Kriess
Assistant Examiner—Jonathan Hall Backenstose
Attorney, Agent, or Firm—Antonelli, Terry, Stout & Kraus

[57] ABSTRACT

The present invention provides a non-stop data processing system having an online data backup function. The method according to the present invention is a data backup method for a computer system having a central processing unit for performing multitask processing, a multiple memory constituted by a plurality of memory devices for online storing data processed by tasks of the central processing unit, and a data backup memory for saving data of the multiple memory, wherein the central processing unit performs parallel processing of (a) user task(s) to treat usual work between the central processing unit and the multiple memory and a maintenance task to save data online from memory devices as a part of the multiple memory to the data backup memory. A data processing system according to the present invention is a data processing system having a central processing unit for performing multitask processing, a multiple memory constituted by a plurality of memory devices for storing data currently processed, and a data backup memory for saving data of the multiple memory, wherein: the central processing unit has (a) user task(s) to write currently processed data into the multiple memory, and a maintenance task to stop updating of memory devices as a part of the multiple memory and save data to the data backup memory; and the system further has an online interface whereby access to the respective memory devices of the multiple memory by the user task(s) and the maintenance task is relayed online.

6 Claims, 7 Drawing Sheets

FIG. 2

| TASK NAME | USER TASK | MAINTENANCE TASK |
|---|---|---|
| ATTRIBUTES | USER ATTRIBUTES (0 0) | MAINTENANCE ATTRIBUTES (1 1) |

FIG. 3

| DISK NAME | DISK A | DISK B |
|---|---|---|
| NO. | 1 | 2 |
| MODE | USER MODE (0 0) | MAINTENANCE MODE (1 1) |

DATA BACKUP METHOD AND DATA PROCESSING SYSTEM HAVING DATA MAINTENANCE FUNCTION

BACKGROUND OF THE INVENTION

The present invention relates to a non-stop computer system having a multiple secondary memory and particularly relates to a non-stop data backup method and a system for saving maintenance data from the secondary memory in a period of online processing.

A non-stop computer system of the type which runs continuously for 24 hours for purposes such as global information processing is required. In this type system, it is necessary to perform maintenance work without stopping processing of usual work through a computer. It is therefore preferable that the maintenance work is constructed in a redundancy system.

Data backup processing is a part of the maintenance work. That is, data are saved from memory means acting as a part of a secondary memory (for example, a magnetic disk device) accumulated online to another medium (for example, a magnetic tape device), to prepare for recovery of the missing of data caused by system-down or the like. In this case, there is the necessity of such consideration that data in the memory means in a period of data backup must be updated without such lacking of consistency that data are partly new and partly old.

A method using a double disk device is used as a data backup method of the type in which usual work is not stopped. According to the method, an operating system (hereinafter called OS) of the central processing unit accesses two disks by using an online interface (in this case, a disk-access interface) at the time of processing of usual work to thereby freely read data from the two disks and freely write data into the two disks. When data are to be saved, the OS sets one of the disks to an offline state so that only one disk can be accessed through the online interface. Then, data are read from the disk set to the offline state, so that the data are saved to a magnetic tape or the like. An offline method in which data are saved from an offline disk to a magnetic tape through another processor or the like is generally used for data backup.

Examples of the data management technique in a data processing system using a computer include: a packing store file double control method disclosed in Japanese Patent Un-examined Publication No. JP-A-62-212819 filed on Mar. 14, 1986 by Nippon Electric Co., Ltd.; a double auxiliary memory device disclosed in Japanese Patent Un-examined Publication No. JP-A-2-133845 filed on Apr. 8, 1986 also by Nippon Electric Co., Ltd.; and a double file management method disclosed in Japanese Patent Un-examined Publication No. JP-A-1-207821 filed on Feb. 16, 1988 by Fujitsu Limited.

The offline data backup method is disadvantageous in cost and running performance in that the number of necessary equipments is increased so that the procedure of changing connection of one processing system to another processing system becomes troublesome and, at the same time, this method lacks both reliability and flexibility in construction of a non-stop data processing system.

It may be considered that the OS of the central processing unit which currently runs for offline work performs parallel processing of usual work and data backup work for saving data from a disk set to an offline state by using an offline interface not opened to users. In the system construction using such an interface not opened to users, however, there is much possibility that confusion may occur at the time of reconstruction of the system. When, for example, the specification for the offline interface is changed by improvement in the version of the OS without any notice to users, software maloperations will occur immediately. Furthermore, because the programming interface for accessing the offline disk is different from the programming interface for accessing the online disk, it is necessary for a program to be always aware of the fact that the offline disk is subject to be accessed. If any mistake in description is made at the time of generating of a program, there is a large risk that disk access by mistake may cause destruction of data or the like.

As described above, there is the present situation that a real system capable of performing parallel processing of data backup work and usual work in a computer system which runs continuously has not been provided yet.

SUMMARY OF THE INVENTION

An object of the present invention is to provide a data backup method in which online processing can be made through a central processing unit which currently runs for usual work, and to provide a highly-reliable non-stop data processing system which can be flexibly adapted to a fault of equipment, extension of equipment, reconstruction of equipment, and so on to thereby solve the aforementioned problems in the conventional techniques.

According to an aspect of the present invention, there is provided a data backup method for a computer system having a central processing unit for performing multitask processing, a multiple memory constituted by a plurality of memory devices for online storing data processed by tasks of the central processing unit, and a data backup memory for saving data of the multiple memory, wherein the central processing unit performs parallel processing of a user task to treat usual work between the central processing unit and the multiple memory and a maintenance task to save data online from memory devices as a part of the multiple memory to the data backup memory.

According to an embodiment of the present invention, there is provided an online interface whereby access to the respective memory devices of the multiple memory by the user task and the maintenance task is relayed online.

According to another embodiment of the present invention, the secondary memory further has a control portion for dynamically changing the memory devices permitted to be accessed by respective tasks, correspondingly to a task currently executed by the central processing unit.

According to the present invention, multitask processing of a user task to treat usual work for writing data into a multiple secondary memory and a maintenance task to save data from the secondary memory to another medium is performed by a computer system.

When a maintenance task is started in the condition where all the memory devices of the secondary memory are accessed by user tasks, generally, memory devices permitted to be accessed by the maintenance task are generally determined on the basis of attributes respectively given to the tasks or on the basis of matching between the attributes and operating modes dynamically given to the memory devices, for parallel processing of the user tasks and the maintenance task.

As described above, each of the memory devices of the multiple memory has an operating mode which can be set independent of other memory devices, so that a memory controller limits the task permitted to be accessed corresponding to the operating mode. As the operating mode is changed, the task permitted to be accessed is changed.

Accordingly, even data backup processing through the multiple memory in the condition where online work runs currently can be accessed through an online interface. There is no necessity of providing the data backup memory as an offline memory as in the conventional techniques and, accordingly, there is no trouble as occurs in the case where an offline interface not opened to users is used.

BRIEF DESCRIPTION OF THE DRAWINGS

FIG. 2 is an explanatory view of a task attribute table for setting attributes of respective tasks;

FIG. 3 is an explanatory view of a disk mode table for setting operating modes of respective disks;

DESCRIPTION OF THE PREFERRED EMBODIMENTS

Figure 1:
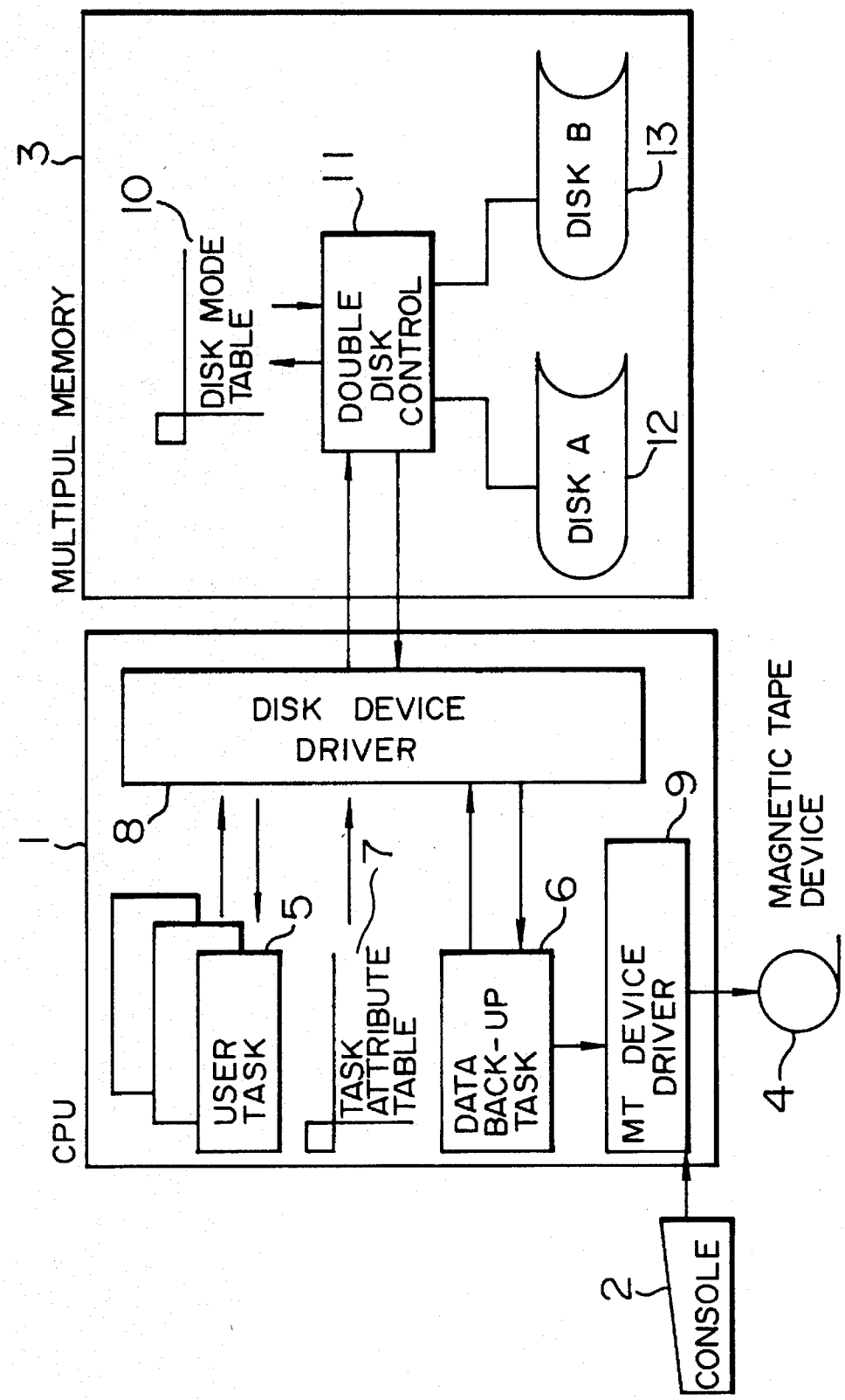
FIG. 1 is a functional block diagram of a computer system having a data backup function showing an embodiment of the present invention.

FIG. 1 is a functional block diagram showing a data processing system having a data backup function for explaining an embodiment of the present invention. This system has a central processing unit 1 for performing parallel processing of usual work (user task) and data backup work (maintenance task), a multiple memory 3 constituted by a plurality of secondary memory devices (in this embodiment, two disk devices 12 and 13) for storing data currently processed in usual work, a data backup memory (in this embodiment, a magnetic tape device) 4 used for saving data from the memory devices (disks) 12 and 13.

The central processing unit 1 includes a main memory not shown, for storing user tasks 5 to treat usual work, a maintenance task 6 for saving data on the disks, and a task attribute table 7 for storing attributes of the user tasks 4 and the maintenance task 6. The central process unit 1 further has a disk device driver 8 for providing an online interface between each task of the central processing unit 1 and the double disk device 3, and a magnetic tape device driver 9 for providing an interface between each task on the central processing unit 1 and the magnetic tape device 4. These device drivers are provided as software used for controlling peripheral devices from the central processing unit 1, so that the software can be changed easily in the case where peripheral devices are changed.

The double disk device 3 has a double disk control portion 11 for controlling the disk-A 12 and disk-B 13 as the double disk device, and a disk mode table 10 for storing the current operating modes of the disk-A 12 and disk-B 13.

In the computer system constructed as described above, when a maintenance task 6 for data backup is started in online work where data processed by a user task 5 are stored in either of the disks A and B used as a double disk, the disks can be respectively allocated for the user task 5 and the maintenance task 6 so that data can be saved from either of the disks A and B to the magnetic tape 4 as parallel processing while the user task is continued.

The system in this embodiment, as described above, has a multitask function for parallel processing of the user task 5 and the maintenance task 6 through the central processing unit 1. In the case of a single-processor computer system in which the central processing unit 1 is constituted by a single processor, the multitask function is executed through a process of dividing a plurality of tasks task by time. On the other hand, in the case of a multi-processor system in which the central processing unit 1 is constituted by a plurality of processors, access to disks by respective tasks is serialized by an OS common to the respective processors. As described above, the multitask function is advantageous in that it is not required for an accessed disk to be aware of whether the central processing unit 1 is constituted by a single processor or by a plurality of processors.

A user attribute and a maintenance attribute indicating operating modes of disk devices permitted to be accessed are respectively given to the user task 5 and the maintenance task 6 in the form of different data patterns, for example, 00 and 11 as shown in FIG. 2, on the table 7. Operating modes (user mode or maintenance mode) respectively allocated also to the disks of the double disk device 3 so as to be changeable are set on the table 10 as shown in FIG. 3. The double disk control portion 11 allocates an access request of the user attribute task 5 to the disk A set to the user mode and allocates an access request of the maintenance attribute task 6 to the disk B set to the maintenance mode. That is, disks respectively permitted to be accessed by the tasks are limited by pattern matching between the attributes of the tasks and the operating modes of the disks. As the operating modes of the respective disks are changed dynamically, disks permitted to be accessed by the respective tasks can be changed dynamically. Accordingly, it is not required for each of the tasks to be aware of which disk is to be accessed on program.

Figure 4:
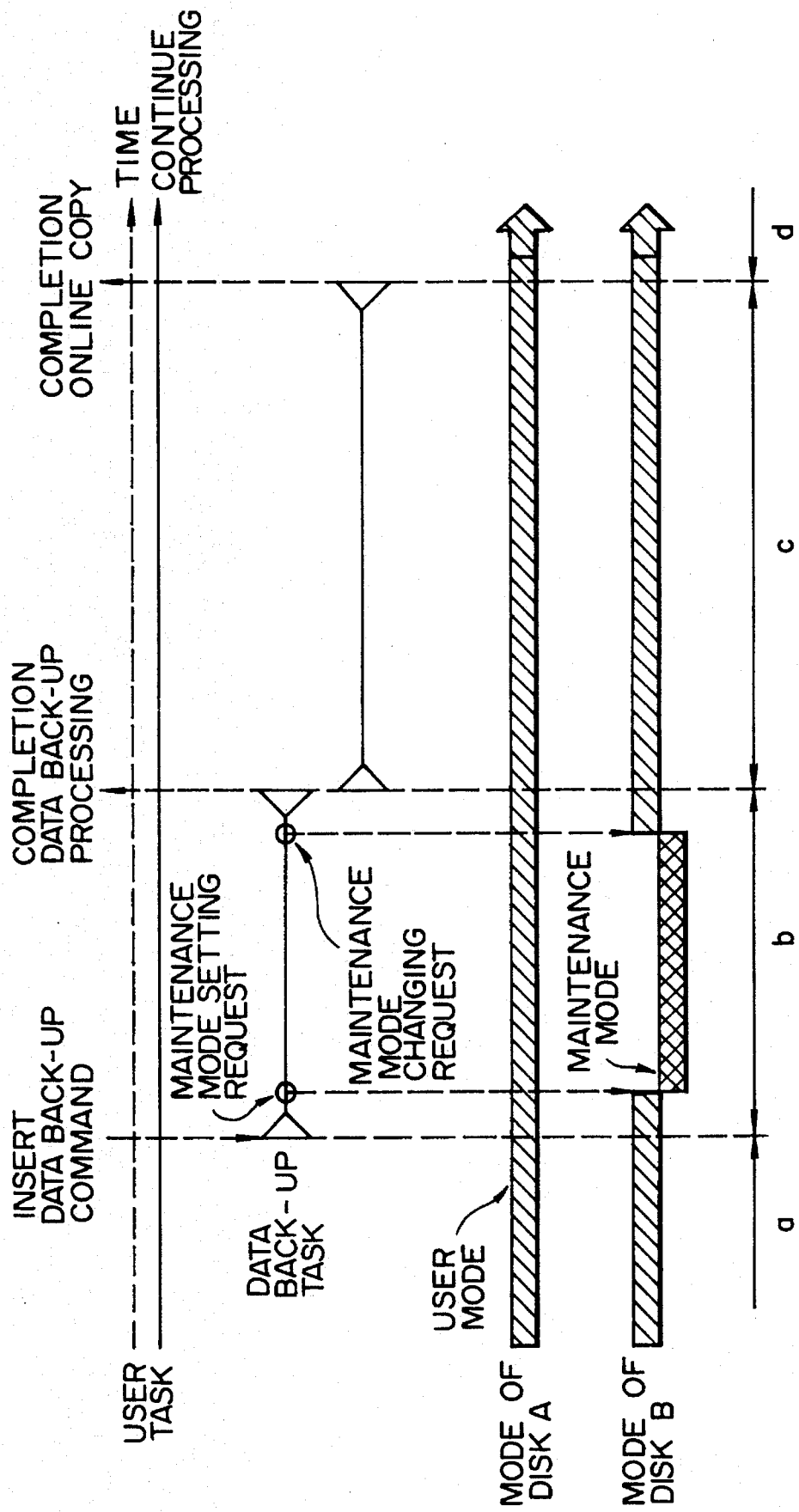
FIG. 4 is a time chart for explaining the processing and operation of the system depicted in FIG. 1.

FIG. 4 is a flow chart showing access by the respective tasks and the changes of the operations of the two disks in this system. Both the two disks of the double disk device 3 are usually set to a user mode. Hence, when an access request is issued from a user task 5, the double disk control portion 11 equally accesses the two disks 12 and 13 to keep data stored in the two disks equal (period a).

When in the state of period a an interrupt command for data backup is provided from a console 2 or the like, a maintenance task 6 is operated so that this system starts parallel processing of the user task 5 and the maintenance task 6. First, the maintenance task 6 issues a maintenance mode setting request, so that the double disk control portion 11 receiving the request changes the mode of one of the two disks (in this embodiment, the mode of disk B) to a maintenance mode. As a result, the disk B is prohibited from being accessed by the user task 5, so that data updating of the disk B is stopped. Because the mode of the disk A is kept in a user mode while the data updating of the disk B is stopped, the user task 5 continues usual work by using the disk A of the user mode. Then, the maintenance task 6 issues a data reading request to the double disk control portion 11.

Because the data backup task 6 has an attribute for maintenance, the reading request of the task is accessed to the disk B of the maintenance mode by the double disk control portion 12. Data read from the disk B are written into the magnetic tape device 4. When all data are read, the maintenance task 6 issues a maintenance mode canceling request to the control portion 11 to terminate the data backup processing (period b).

When the data backup work is terminated, the control portion 11 resets the disk B of the maintenance mode to a user mode. Because the disk B returned to the user mode is free from updating of data stored therein in the period of data backup processing, data are copied from the disk A by hardware means to thereby make data equal between the two disks (online copy). Although the online copy has been known for a long time as a measure used at the time of fault recovery of the double disk device, the online copy task may be processed in parallel with the user task 5 (period c). When the equalizing of the two disks is terminated, the two disks are returned to the original form of a double disk device so that the user task 5 can equally access the disks 12 and 13 (period d).

In the following, this embodiment, with respect to matching between tasks and disks and canceling, will be described more in detail.

Figure 5:
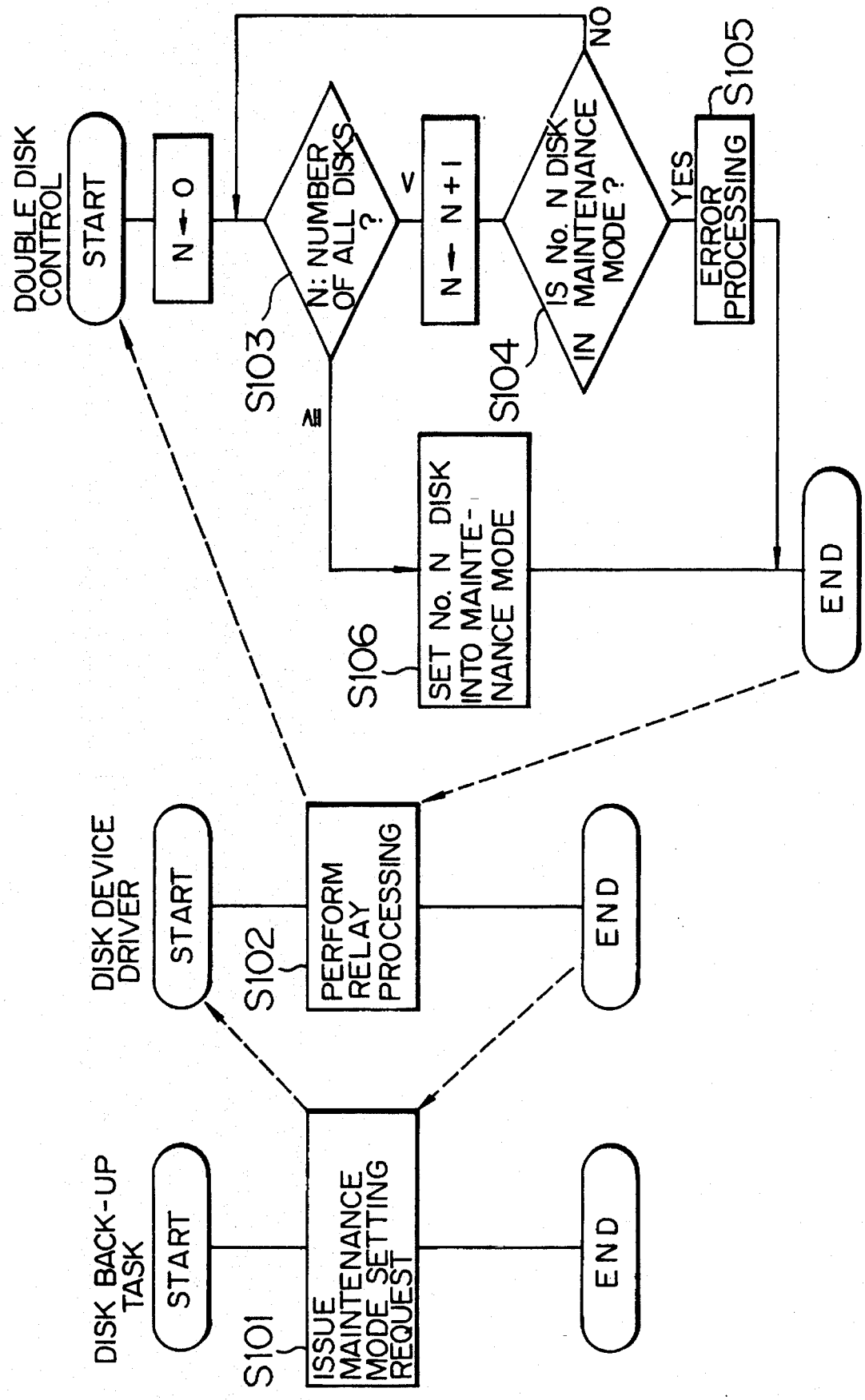
FIG. 5 is a flow chart of a process for setting a maintenance mode to a multiple disk device from a data backup task (maintenance task)

FIG. 5 is a flow chart showing a process of setting a maintenance mode. When a maintenance task 6 is operated in the condition where a user task 5 runs currently, the maintenance task 6 issues a maintenance mode setting request to the disk device driver 8 in a step S101. The disk driver 8 receiving the request relays it to the double disk control portion 11 (a step S102), so that the control portion 11 checks whether or not there is any disk of maintenance mode while referring to the disk mode table 10 for all N (in this embodiment, N=2) disks (steps S103 and S104). If the maintenance mode has been set already, the setting request is canceled as error (a step S105) so that all the two disks of the double disk device are not set to the maintenance mode simultaneously. If there is no setting of the maintenance mode in each of the disks, the disk of number N (in this embodiment, N=2, that is, disk-B 13) is set to the maintenance mode (a step S106). When the disk-B 13 is set to the maintenance mode, access requests given from user tasks 5 are executed only with respect to the disk-A 12 being in the user mode so that data in the disk-B 13 cannot be updated through the user tasks 5. As described above, the maintenance mode setting request given by the maintenance task in the central processing unit 1 can be provided without specifying of one from the disks of the double disk device 3.

Figure 6:
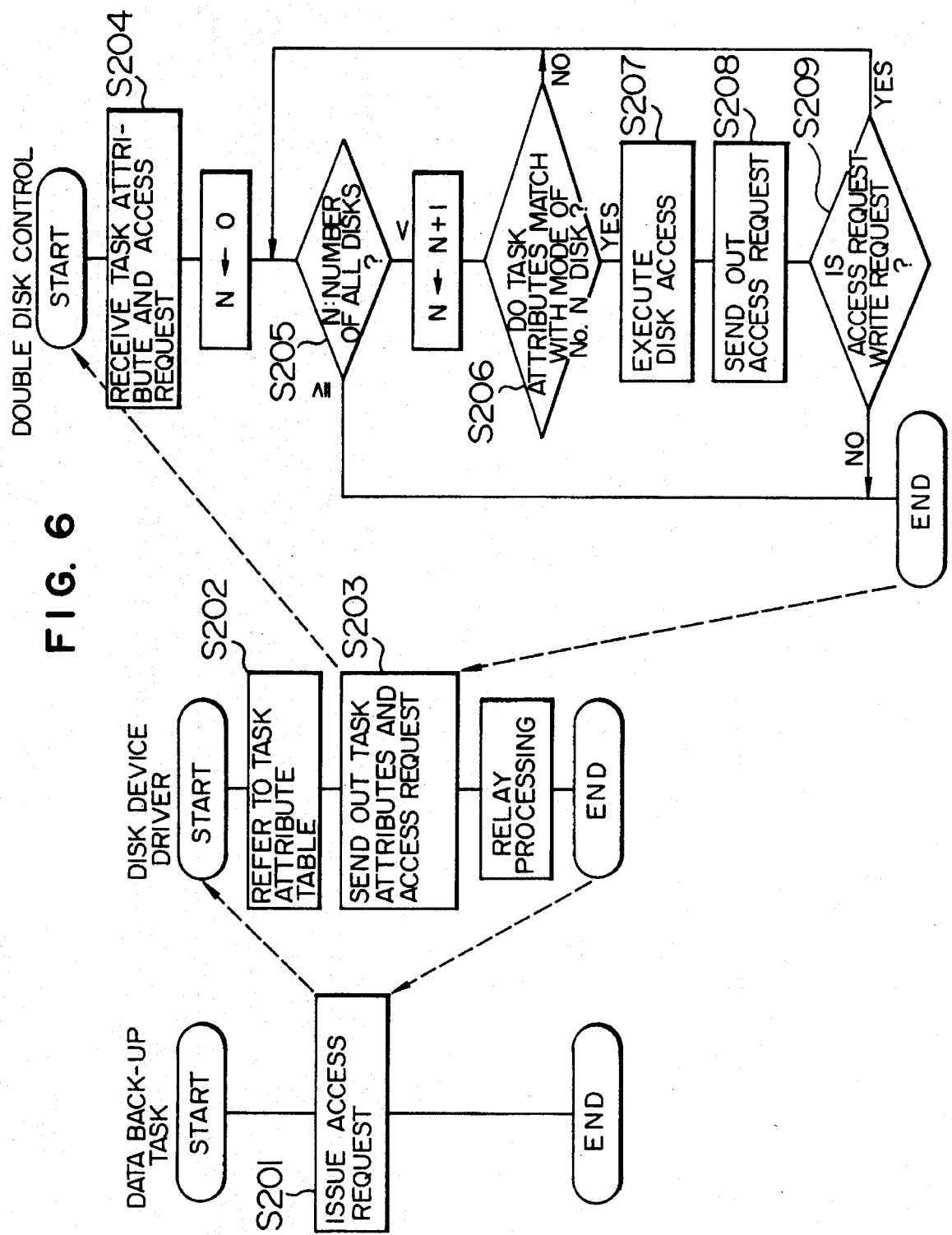
FIG. 6 is a flow chart of a process for accessing the multiple disk device from the data backup task (maintenance task)

FIG. 6 is a flow chart showing a process for matching between tasks and disks after the setting of the maintenance mode. The maintenance task 6 issues an access request to the disk driver (a step S201). The driver 8 receiving the access request acquires the attribute of the task issuing the access request while referring to the task attribute table 7 and sends out the access request, together with the task attribute, to the double disk control-portion 11 (steps S202 and S203). The control portion 11 receiving both the task attribute and the access request (a step S204) detects all disk devices permitted to be accessed by the received task attribute (steps S205 and S206) and executes access requested to the all disk devices thus detected (a step S207). Because in this embodiment the maintenance task 6 is an access requester, the maintenance attribute is matched with the maintenance mode of N=2 so that the disk B is accessed to perform reading of backup data. The result of access is returned to the task which is an access requester, through the disk device driver 8. Because in this system the user task 5 and the maintenance task 6 are processed in parallel, the matching in the step S206 and the execution of access in the step S207 are performed correspondingly to these tasks so that the tasks can respectively access the disks without being aware of the disks.

Figure 7:
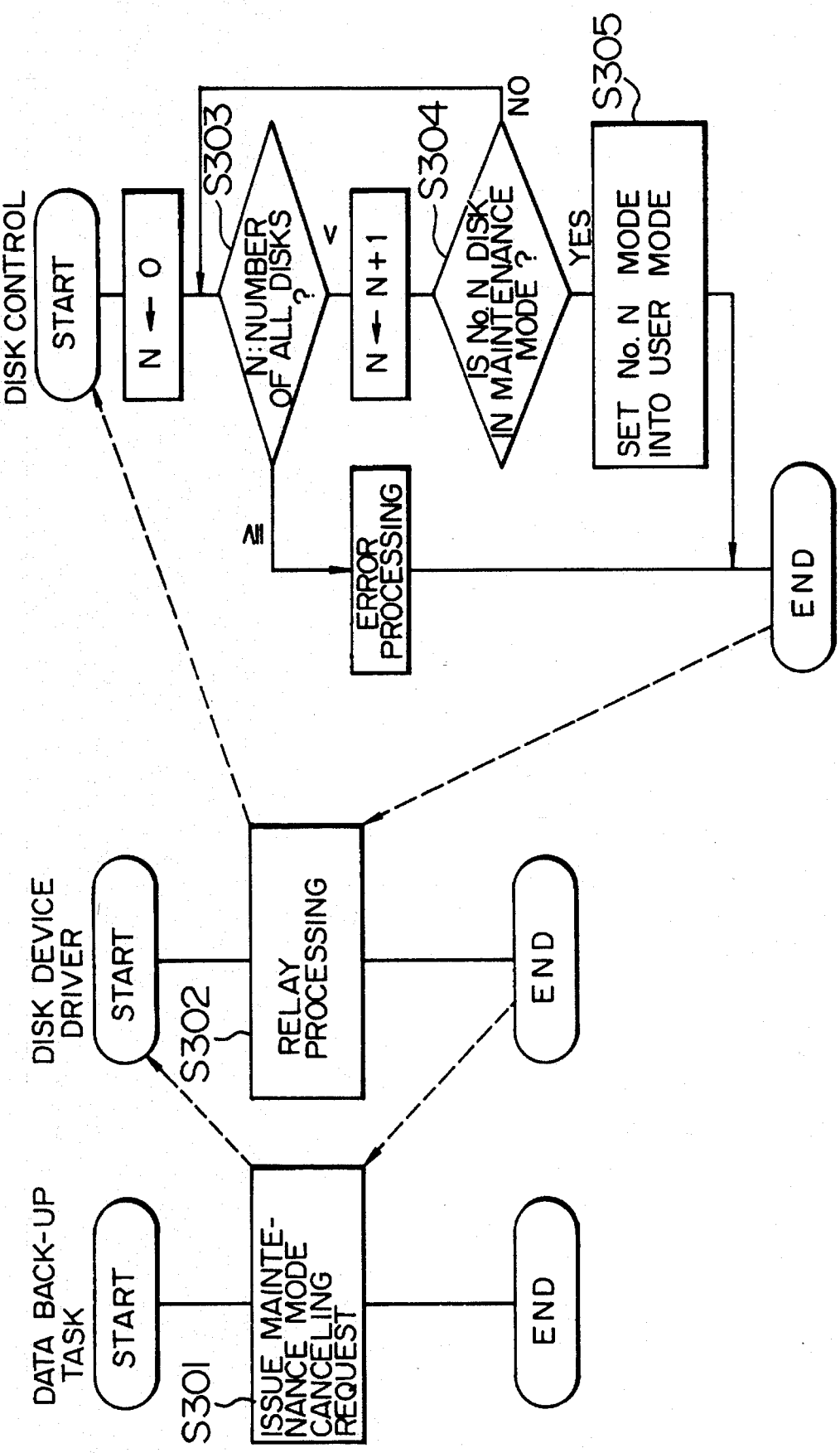
FIG. 7 is a flow chart of a process for canceling the maintenance mode of the multiple disk device from the data backup task (maintenance task)

FIG. 7 is a flow chart showing a process for canceling the maintenance mode. When the data backup work to the magnetic tape device 4 is terminated, the maintenance task 6 issues a maintenance mode canceling request to the double disk control portion 11 through the disk device driver 8 (a step S301). The double disk control portion 11 receiving the canceling request resets the disk-B 13 of maintenance mode to a user mode while referring to the disk attribute table 10 (steps S304 and S305).

In the aforementioned embodiment, the relations between tasks and disks to be accessed are decided by matching between the attributes of the tasks and the operating modes of the disks. This system, however, can be applied to the case where the relations of disks with attributes may be decided so as to be fixed by providing only the attributes of the tasks. In this case, for example, the control portion 11 receiving the maintenance attribute controls disks to select the disk number 2 (the disk B). Because disks permitted to be accessed by the task attribute can be decided also in this case, access through an online interface can be made without any necessity of programming.

In the following, another embodiment of the invention in which the system is operated by a multiple disk device constituted by three or more disks will be described. In the method in which disks to be subjected to data reading are described on a program of the maintenance task 6, as in the conventional techniques, wasteful labor is required for incorporating a data backup process for designating a normal disk at the time of detecting of a fault disk and then saving data from the fault disk to the normal disk, into the maintenance task on the consideration of the case where a fault occurs in a disk which runs currently. According to the present invention, however, the disk controller 11 can decide disks to be set to the maintenance mode so dynamically that the disk controller 11 can set normal disks to the maintenance mode while avoiding a fault disk, by adding a fault mode to the user and maintenance modes and neglecting the existence of the disk set to the fault mode.

Figure 8:
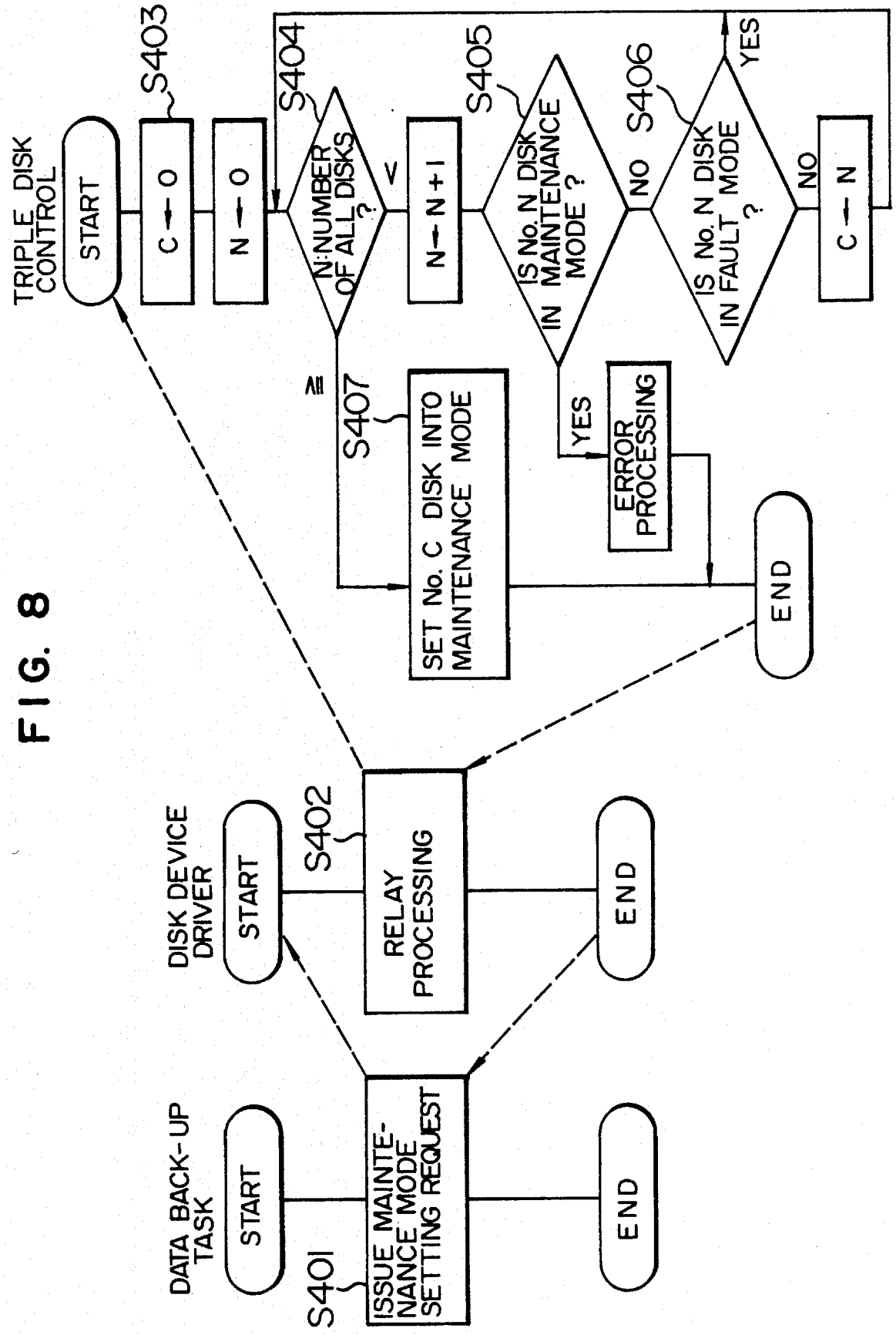
FIG. 8 is a flow chart of a process for setting a maintenance mode to the multiple disk device from a data backup task (maintenance task) while avoiding a disk in which a fault occurs.

FIG. 8 is a flow chart showing a process of setting the maintenance mode while avoiding the fault disk. A fault of a disk is detected by a diagnosis means (not shown) of the disk control portion 11 on the basis of contradiction of data in a disk management area, and so on. When a fault disk is detected, the mode of the fault disk on the table 10 is set to a fault mode by the control portion 11. When in this condition a maintenance mode setting request to set one of the three or more disks to the maintenance mode is issued from the maintenance task 6 (a step S401), the disk control portion 11 checks whether the mode of each disk is neither maintenance mode nor fault mode (steps S405 and 406) and updates the disk number set to the user mode to variable C so that the disk numbers finally stored in the variable C are set to the maintenance mode after the checking of the all disks (a step S407).

In this embodiment, access to a fault disk can be avoided even in the case where the maintenance task 6 (of course, also the user task 5) accesses a disk without being aware of the state of the disk.

The respective aforementioned embodiments have been described upon the case where one memory means in a double or triple memory is used for data backup work and the residual one or two memory means are exclusively used for usual work. In the recent type fault tolerant computer system and the like, it is required to multiplex work inclusive of maintenance work. The present invention can be applied to such needs by operating this system with a multiple disk device constituted by four or more disks. That is, four disks are usually used in the user mode but two disks are set to the maintenance mode at the time of data backup. Data are equally read from the two disks by the maintenance task so that the magnetic tape device driver 9 selects one earlier reaching thereto to store the selected data in the magnetic tape device 4. Hence, not only the user task 5 but the maintenance task 6 can be always guaranteed by the double route at the least, so that reliability on the system can be improved.

According to the present invention, usual work and data backup work can be processed in parallel through changing a part of the memory from access of the user task to access of the maintenance task, so that it is not necessary to provide any special processor for data backup, as in the prior art. Furthermore, an online interface opened to users can be used, so that a highly-reliable non-stop data processing system can be provided. Furthermore, access of each task to the respective memory means of the multiple memory can be designated in an higher-rank level, so that it is not required for the task to be aware of the memory means to be accessed. Accordingly, failure and data destruction caused by a mistake on program can be prevented so that this system can be flexibly adapted to system modification. Furthermore, the memory means permitted to be accessed by the task can be changed dynamically at the multiple memory side, so that a data backup method flexibly adapted to a fault of a disk can be provided.

What is claimed is:

1. A data backup method for a computer system having a central processing unit for performing a plurality of tasks in parallel, a multiple memory including at least two memory means and a control means for managing said memory means, and a data backup memory for backup of data stored in said memory means of said multiple memory, said method comprising the computer-executed steps of:

storing an operation mode of each said memory means of said multiple memory into a table previously provided in said multiple memory;

when said central processing unit issues a maintenance task for evacuating data from said memory means of said multiple memory to said backup memory, said control means performs the steps of:

comparing an operation mode assigned to said maintenance task with said operation mode stored in said table of each said memory means of said multiple memory;

changing the operation mode of at least one memory means to said operation mode assigned to said maintenance task in accordance with a result of said comparing step; and executing said maintenance task with respect to said memory means whose operation mode has been changed.

2. A data backup method for a computer system having a central processing unit for performing a plurality of tasks in parallel, a multiple memory including at least two memory means and a control means for managing said memory means, and a data backup memory for backup of data stored in said memory means of said multiple memory, said method comprising the computer-executed steps of:

successively storing operation modes of said memory means in said multiple memory into a table previously provided in said multiple memory;

when said central processing unit issues a maintenance task for evacuating data from said memory means of said multiple memory to said backup memory, said control means performs the steps of:

comparing an operation mode assigned to said maintenance task with said operation modes stored in said table of each said memory means of said multiple memory;

after said comparing step, when there is no operation mode coincident with said operation mode assigned to said maintenance task in said table, changing the operation mode lastly stored in the memory means of said multiple memory means to said operation mode assigned to said maintenance task; and executing said maintenance task with respect to said memory means whose operation mode has been changed.

3. A data backup method for a computer system having a central processing unit for performing a plurality of tasks in parallel, a multiple memory including at least two memory means and a control means for managing said memory means, and a data backup memory for backup of data stored in said memory means of said multiple memory, said method comprising the computer-executed steps of:

successively storing operation modes of said memory means in said multiple memory or a failure mode indicative of a failure of the memory means into a table previously provided in said multiple memory;

when said central processing unit issues a maintenance task for evacuating data from said memory means of said multiple memory to said backup memory, said control means performs the steps of:

comparing an operation mode assigned to said maintenance task with said operation modes stored in said table of each said memory means of said multiple memory;

after said comparing, when there is no operation mode coincident with said operation mode assigned to said maintenance task in said table, changing the operation mode lastly stored in the memory means of said multiple memory means to said operation mode assigned to said maintenance task; and executing said maintenance task with respect to said memory means whose operation mode has been changed.

4. A data backup method according to claim 1, wherein when a user task is executed to store data from said central processing unit to said memory means of said multiple memory, it is prohibited from writing data from said central processing unit to said memory means whose operation mode has been changed.

5. A data backup method according to claim 1, wherein if said comparing step shows there is an operation mode coincident with said operation mode assigned to said maintenance task in said table, said comparing step is stopped.

6. A data processing system having a central processing unit for performing a plurality of tasks in parallel, a multiple memory including at least two memory means and a memory management means for managing said memory means, and a data backup memory for backup of data stored in said memory means of said multiple memory, said multiple memory comprising:

a table for storing an operation mode for each said memory means of said multiple memory;

memory management means for managing said memory means comprising:
  a) comparing means for comparing an operation mode assigned to a maintenance task issued from said central processing unit for evacuating data from said memory means to said backup memory with said operation mode stored in said table of each said memory means of said multiple memory,
  b) control means for changing the operation mode of at least one memory means to said operation mode assigned to said maintenance task,
  c) execution means for starting execution of a maintenance task for evacuation of data from said at least one memory means to said data backup memory.

* * * * *